Dec. 8, 1953  W. G. ADAMS  2,661,854
PORTABLE CRANE
Filed Nov. 8, 1948  3 Sheets-Sheet 1

INVENTOR.
W. G. Adams
BY
Attorneys.

Dec. 8, 1953

W. G. ADAMS 2,661,854

PORTABLE CRANE

Filed Nov. 8, 1948

INVENTOR.
W. G. Adams

BY

Attorneys.

Dec. 8, 1953 — W. G. ADAMS — 2,661,854
PORTABLE CRANE
Filed Nov. 8, 1948 — 3 Sheets-Sheet 3
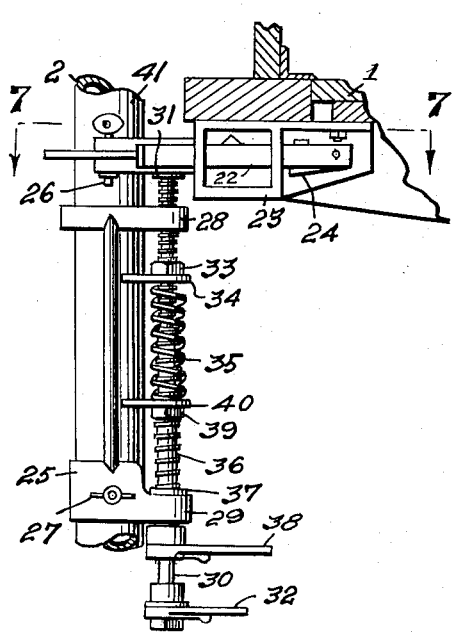
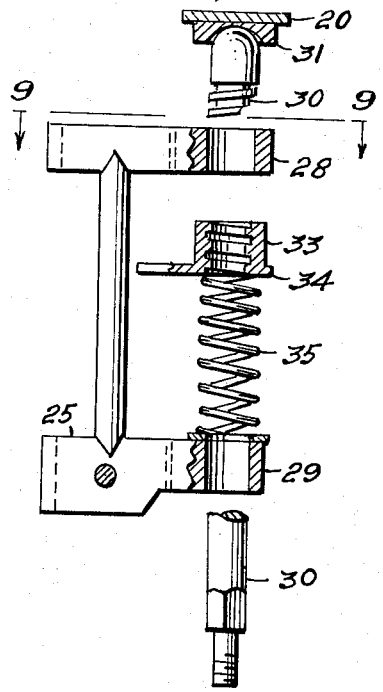
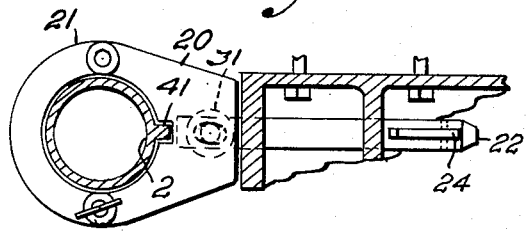
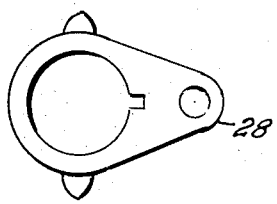
INVENTOR.
W. G. Adams
BY
Attorneys.

Patented Dec. 8, 1953

2,661,854

UNITED STATES PATENT OFFICE 2,661,854

PORTABLE CRANE

William Gatewood Adams, Richmond, Va.

Application November 8, 1948, Serial No. 58,901

15 Claims. (Cl. 214—75)

The invention relates to devices for handling material, particularly devices of the portable type, and has especial reference to those that are designed for use in connection with material-hauling vehicles, such as trucks or railway cars, for the purpose of loading and unloading the same.

In its simplest embodiment the invention, generally stated, consists of improvements in the particular type of appliance for handling material into and out of spring-supported bodies of vehicles wherein the weight of the material lifted is borne by a stiff upright member that is designed to resist bending throughout its entire length, and to stand upright adjacent to the body of a vehicle, the said weight, as well as that of the device, being then transmitted or transferred through the upright member to the ground beneath its foot, rather than to the body of the vehicle. Patent 1,961,541, awarded applicant June 5, 1934, delineates a device of this type.

More particularly, my present invention relates to that type of crane which has several outstanding features distinguishing the same from the prior art portable cranes. One important feature resides in the fact that in my present crane no lateral support in the form of a guy, stiff-leg or other device is required at the top of the mast or post for connecting it to the truck, car, or other apparatus in connection with which the crane is used. Another important feature consists in that the present crane is entirely free from dependence, for lateral stability, on any attachment of the mast or post to the truck or the like by means such as would result in a fixed relation of the direction of the mast or post axis with respect to the plane of the floor of the truck body, car, or the like. Dependence for lateral support upon the two foregoing modes of attachment of a crane to a truck body, which modes are prevalent in prior art cranes, is eliminated in the present invention by means of the continuous, rigid nature of the mast which provides for cantilever action of that portion of the mast or post that extends upward of the level of the floor of the truck body, as well as by the provision of weight-induced frictional adherence of the foot of the mast or the post with the ground. Accordingly, in the present invention only one fastening of the mast to the truck is required and which fastening is located below the connection of the mast or post to the outstanding arm or boom of the crane or other material handling device utilized with the post or mast. This one fastening, including a part or parts rigid with the truck body in the neighborhood of the floor thereof, includes relatively movable parts providing for both longitudinal and angular movement of the truck body with respect to the mast and vice versa.

Another feature of the present invention in combination with the foregoing features relative to the mounting of the mast resides in the provision of means for transferring or transmitting at least part of the weight of the body of the vehicle to the ground beneath the foot of the mast to assist in stabilizing the same. It is of particular importance that this feature of transferring or transmitting the weight of the vehicle body to the ground beneath the mast provides for adjustability or control of the amount of weight conveyed and also includes resilient means providing for automatic compensation for loss of pressure on the ground that otherwise would accompany a raise in height of the body of a spring supported vehicle as the springs respond to varying load conditions.

Therefore, and with the features just mentioned, a truck body is able to tilt, as well as to move vertically up and down without any appreciable corresponding movement of the mast with the stability of the mast being increased by the portion of the weight of the body transferred to the ground beneath the mast. Obviously characteristics of this type are peculiarly adapted to increase the efficiency of a portable crane, particularly where the body of the vehicle in connection with which the crane is utilized is supported by springs so that the floor of the body will move under varying load conditions and which movement will be either vertically up and down or a tilting movement depending on the disposition of the load, the force thereof and the area of the truck body floor upon which the load is placed.

In the interest of a maximum of portability for a device having the above described characteristics, it is desirable that in its construction a light weight metal be employed. It is important also that a maximum of frictionally induced adhesion of the foot to the ground be available for stabilizing the lower end of the upright member, thereby avoiding necessity for cumbersome, extraneous, manually operated fastening of the foot. But any increased portability by reducing the weight, results in less pressure on the foot, accompanied by a decrease in frictional adhesion thereof to the ground, thus depriving the device of needed stability for resisting lateral forces. It is obvious that tightening up on an outwardly sloping load line, in an effort to pick up an object that is not located directly under the hook, could deprive a very light device of this type of its stability, before sufficient of the weight to be lifted on the hook is brought to bear on the foot to induce adequate frictional resistance there.

It is with all of the above facts in view that I have devised the present invention, which has for an important object improvement in apparatus having characteristics as above set forth, by provision of means for inducing increased friction between the upright member and the underlying ground, and utilizing the resulting increased adhesion to the ground, in cooperation with an upper thrust-conveying sliding attachment, or a hinged or flexible connection, of the said member to the vehicle, as means for providing a maximum of additional stability for the device during its operation.

Another object is to provide a device or mechanism of this character which will be simple and inexpensive to manufacture, of light weight, easy to assemble and set up in relation to a vehicle, and convenient to transport with the vehicle, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings which show an embodiment of the invention and in which:

Figure 3 is a fragmentary side view showing details of suitable construction at upper end of the mast, or post, where it joins an outstanding arm, or jib.

Figure 6 is a view illustrating some of the features as are shown in Figure 5, together with certain further improvements hereinafter described.

Figure 7 is a part sectional view and part plan view taken on line 7—7 of Figure 6 and illustrating the connecting means for connecting the mast or post to the vehicle body.

Figure 8 is a fragmentary view on an enlarged scale of certain components of the weight transmitting device illustrated in Figure 5; and Figure 9 is a plan view of the post encircling fixture taken on line 9—9 of Figure 8.

Similar characters of reference designate corresponding parts throughout.

Figure 1:
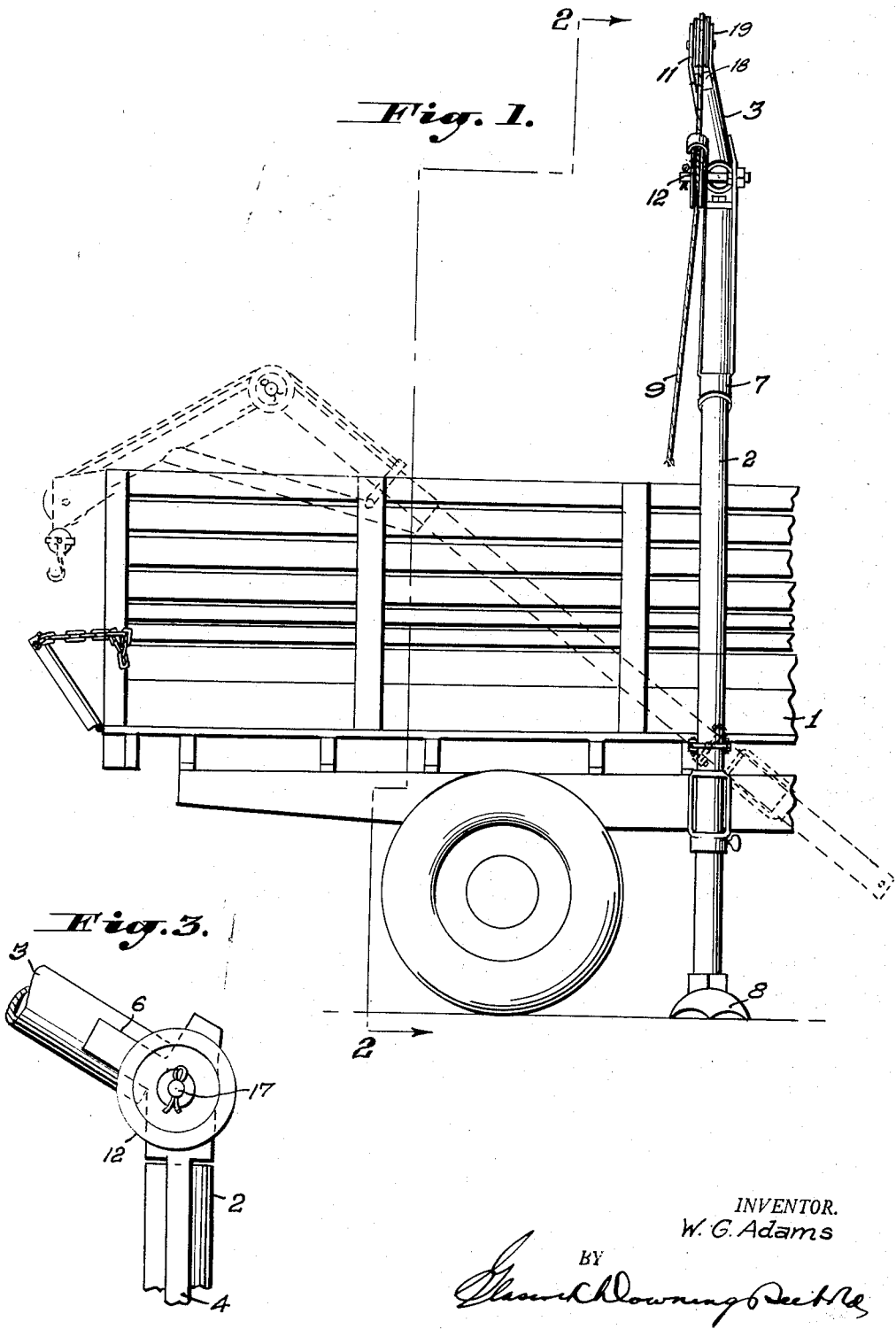
Figure 1 is a part side view of a truck with a portable material-handling device attached in operative position thereto. Shown also in this view, in broken lines, is a method of transporting the device without detaching it from the vehicle.

In the drawings the numeral 1 designates a truck such as frequently is employed for hauling materials. In carrying out the invention in its preferred form, I provide a crane or derrick structure of a type that is adapted for positioning adjacent to a vehicle for the purpose of handling or moving material onto or off the vehicle body. The crane in the preferred form includes a post, or mast member 2, which post must be characterized by stiffness, such as will enable it to resist bending, a foot piece or shoe 8, and material-handling appliance supported by the post comprising a jib, or boom assembly and hoisting tackle. Preferably, where practicable, the parts should be made of an aluminum alloy.

The post 2 in the embodiment shown, is of tubular construction, its size and height being commensurate respectively with the maximum weight the device is designed to handle, and the height to which it is proposed that material will be piled on vehicles that will be served by it.

The jib in its preferred embodiment here described includes an outstanding member or arm 3; upright members 4 and a brace 5. The arm 3 and brace 5 are of tubular construction and the two upright pieces 4 are bars. Each of these bars is made integral at its upper end with the arm 3 through one of two intervening plates 6, each of which plates is rigidly fixed at its upper end to the arm 3 and at its other end to one of the bars 4. The brace 5 is made integral at one end with the member 3 and at the other end with the lower ends of bars 4, which latter connection is by means of an intervening sleeve 7, rigidly fixed to the bars 4 as well as to the brace 5 and which loosely encircles the post 2 to permit rotary movement of the jib about the same.

Figure 4:
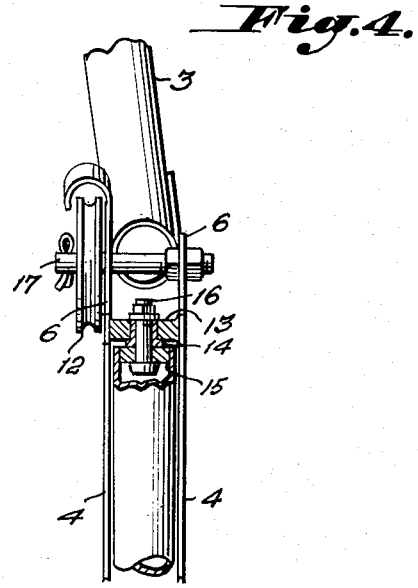
Figure 4 is a part sectional view of the structure shown in Figure 3.

As shown in Figure 4 an apertured web 13 is set between and integrally secured to the plates 6 at their juncture with the spaced bars 4. A flanged bushing 14 made preferably of bronze or other material suitable for use as a journal, extends through the central aperture in, and projects slightly above, the web 13. The upper end of the mast 2 has made integral therewith, a circular plate 15 which has concentrically fixed therein the projecting pin 16, which pin is of length sufficient to pass through bushing 14 as well as through the washer shown, and a nut; the washer having an outside diameter greater than that of the upper end of bushing 14.

Figure 2:
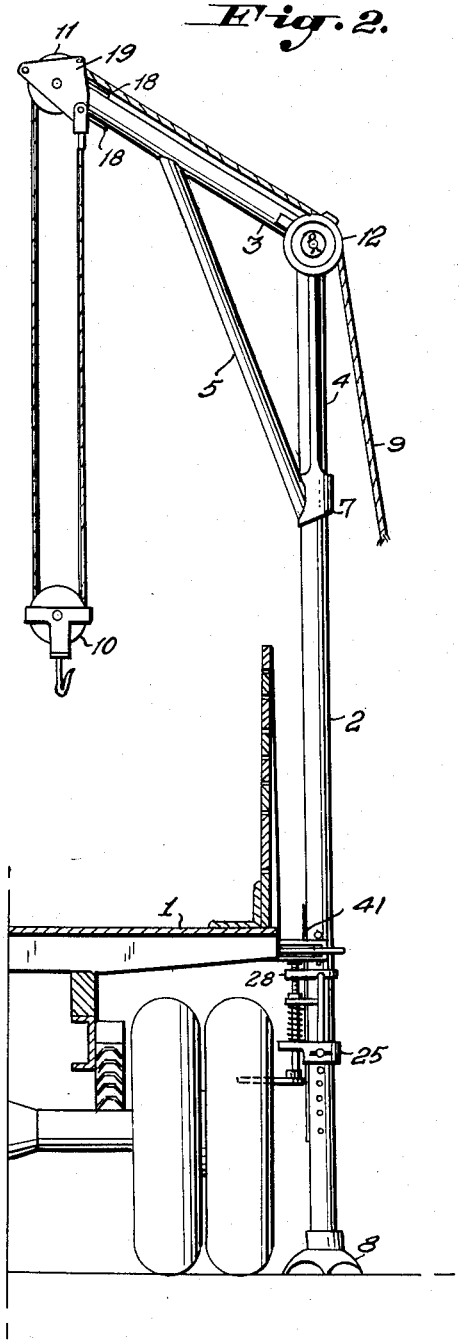
Figure 2 is a part sectional view taken on line 2—2 of Figure 1.

When the jib assembly is positioned as shown in Figures 2, 3 and 4, with the nut screwed on the pin 16 and clamped tightly against the washer that rests on top of the bushing 14, the bushing serves as a gudgeon pin and the jib assembly, or outstanding arm 3, is free to have rotary movement with respect to the post, and is supported entirely thereby. This assembly corresponds to the member generally called a boom when the supporting upright member is called a mast.

Referring again to Figure 4, the plates 6, have suitably located holes in which the transversely extending pin 17 is snugly fitted, one of the plates being tightly clamped between two nuts on the pin, which latter projects through the other plate to provide a journal about which the sheave or pulley 12 may rotate. Two bars 18, Figure 2, made integral respectively with the top and bottom of the outer end of member 3, extend between, and serve as connecting means for fixing to the boom end a pair of check plates 19. A sheave or pulley 11 is rotatably mounted between these plates. The rope 9 is arranged for handling loads by means of the hook at 10 in an obvious manner.

It is noted, see Figure 1, that by assembling the pulleys 11 and 12 so that the upright plane of symmetry, common to both of them, lies outside of the mast 2, the boom may be rotated about the mast through an angle of 180 degrees without twisting the rope 9 around the upper portion of the mast, and that the rope may accordingly be freely pulled, or played out, through the sheaves by an operator positioned either on the ground or in the vehicle, irrespective of the position of the boom.

Figure 5:
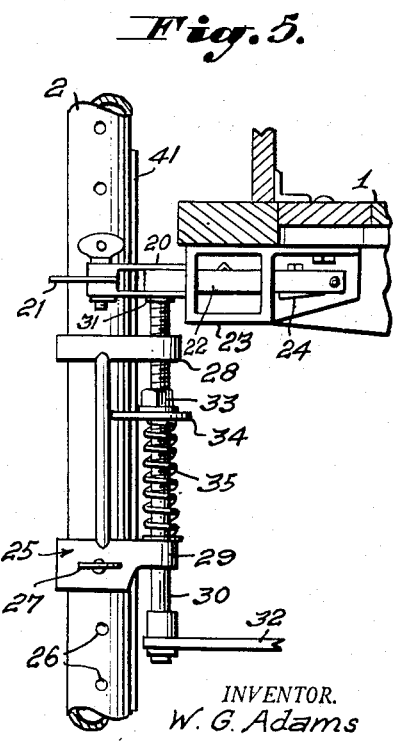
Figure 5 is a view illustrating a method for coordinating certain features of the invention with those of the connection of mast to the truck.

The means used in the embodiment herein shown for connecting the crane to the vehicle, is a shackle which loosely encircles the mast 2 and as indicated in Figures 5 and 7 includes a forked base portion 20, spanned at its forked ends by a semicircular hinged gate piece 21. A horizontal pin 22 is fixed at one of its end to the shackle base portion 20 and is rotatably mounted in two bearings that are carried by a fitting or bracket 23, one or more of which fittings may be fastened at suitable points along the body of the vehicle. A latch 24, pivotally mounted within a slot in the pin 22 provides automatic locking of the shackle to the fitting 23 when the pin is shoved through the bearings in the fitting. This connection it is noted, provides lateral support for the post, at the same time preventing transmission of vertical load from the post to the body of the vehicle.

While the above described connection of the mast to the body of the vehicle comprising the shackle and a horizontal pivot pin 4 with its latch 24 comprehends means for permitting a quick detachment of the mast with its material handling means at the upper end thereof for storage in the body of the truck or other vehicle, it also permits the temporary folding or pivoting of the mast relative to the vehicle so that the vehicle can move around to gather or handle material in a restricted area without the necessity of completely detaching the mast. This feature is shown in broken lines in Figure 1 which illustrates that the mast has been rocked about the axis of the pivot pin 22. This tilting or rocking motion of the mast or post with respect to the truck body is not to be confused with the angular movement of the body of the vehicle in all directions with respect to the upright post and which body movement accompanies uneven flexing of the spring supporting the vehicle body during changing load conditions. The relative movement between the body of the vehicle and the mast when the latter is upright is permitted by the provision of the shackle that loosely encircles the mast. It thus follows that the vehicle body even though carrying the shackle can tilt or slide downwardly or upwardly relative to the mast while the pivot pin will further facilitate fore and aft tilting of the vehicle body relative to the mast.

It is obvious that when the crane is connected to a truck as outlined above, and eccentric forces are applied to it as result of the handling of loads by means of the rope 9, two equal and opposite horizontal reactions operate to stabilize the post or mast 2 in upright position; one at the shackle connection 20, 21 and a second one at the post foot 8. The first is provided by the truck body which, when the brakes are applied will present the necessary thrust resistance. The second, in lieu of other restraining device at the foot, must be by frictional resistance between the foot and the underlying material. In this type of portable crane stability during operation is dependent upon efficiency of these two cooperating reactions. It is especially with respect to improvement in the second of the two above referred to reactions, that this invention is concerned.

Means that I provide to insure more dependable lateral stability for the bottom of the post, as shown in the embodiment herein described, includes a weight transmitting or transferring mechanism. Referring to Figures 5 and 7, this mechanism includes a fixture 25 that is slidably mounted on the post 2. Apertures 26 are provided in aligning pairs through opposite walls of the tubular post at longitudinally spaced intervals along the post. A locking pin 27 passing through a selected pair of these apertures and also through an aligning pair of holes in the lower ring member of fixture 25, provides adjustable support for fixture 25 on the post. The fixture has upper and lower aligning journal bearings, 28 and 29, in which a vertical shaft 30 is rotatably mounted. Note that both bearings 28 and 29 are merely journal bearings; both being without threads for engagement with the threads on shaft 30, see Figure 8. A concave thrust bearing member 31 is coaxially positioned with respect to the shaft 30, and secured to the bottom of the shackle base 20 and the upper end of shaft 30 is suitably shaped for rotary engagement therewith, Figure 8. The lower end of the shaft 30 is equipped with a ratchet handle 32 for rotating it, and the upper portion is provided with screw threads. A nut 33 is mounted on the threaded portion of shaft 30 and has a lower flange plate 34, suitably shaped for sliding engagement with the post 2 so as to prevent turning of the nut during shaft rotation. A spiral spring 35 is concentrically mounted on the shaft 30, having its lower end abutting a washer which rests on upper end of the bearing 29, which bearing transfers through the fixture 25, and the pin 27, to the post, any pressure coming to the spring through the shaft 30 and the nut 33. The post has fixed thereto a long key 41 for cooperational engagement with keyways suitably positioned in the shackle base 20, the flange plate 34 and in the fixture 25. This relationship between the key 41 and the various keyways permits slidable movement of the shackle along the post and also permits that the fixture 25 can be moved longitudinally of the post for adjusting purposes.

By turning the handle 32 in a direction appropriate for forcing the shaft 30 upwardly through the nut 33 a part of the weight of the body of the vehicle, weight normally taken to the ground beneath the vehicle wheels, is brought to bear on top of the shaft 30, being thence transferred through the nut 33, the spring 35, its lower abutment washer, bearing 29, pin 27 and the post 2 to the ground immediately beneath the shoe or foot 8. It is noted that the potential force that may thus be stored in the spring 35 by judicious operation of the handle 32, provides within certain limits, automatic compensation for the changing height relation between the vehicle body and the fixture 25 during flexing of the vehicle springs under varying load conditions of the body, thereby in spite of the said changing height, maintaining requisite pressure through the foot to the ground for insuring frictional adhesion needed to prevent lateral movement, or kicking outwardly, of the post foot.

As loading or unloading of the vehicle progresses, the supporting springs of the vehicle may change the body height to such extent that the spring 35 can no longer properly function, whereupon in order to maintain requisite pressure on the post foot, it becomes necessary to relax the spring 35 and reset the fixture with the pin 27 in a different pair of the holes 26. In order to avoid excessive recurrence of this inconvenience, I make available the further improvement which is illustrated in the embodiment shown in Figure 6. In this improvement I provide an auxiliary hollow screw member 36, concentrically rotatably mounted on the shaft 30 and having at its lower end where it projects below the bearing 29, a ratchet handle 38 for turning it. A thrust bearing 37 is made integral with this screw member so as to rotatably engage the upper end of bearing 29. A threaded nut 39, equipped with a flange plate 40 to slidably engage the post, similar to that described for the nut 33, is mounted to engage the threads on the member 36. The spring 35 mounted on shaft 30, is in this embodiment arranged to encircle the upper portion of this hollow screw member also and has for its lower abutment the flange 40 of the nut 39, instead of the bearing 29 on which latter it rests in the arrangement illustrated in Figure 5. Thus I provide auxiliary means for adjusting the position of one of the abutments of the spiral spring 35 in order to enable the operator to have additional convenient means of control of the pressure brought to bear thereon, thus obviating the need for too frequent change of position of the pin 27 and fixture 25. When preparing to add to the load on a truck by means of a crane equipped with this further improvement, the operator, before selecting the appropriate one of apertures 26 for anchorage of the fixture 25 by pin 27, will turn the handle 38 so as to run the nut 39 to a high position on the threads of member 36, and, conversely, when preparing to remove material from the truck he will, before setting the pin 27, run the nut 39 to a low position on the threads. Thus, in either case he has resilient means available for extending the limits within which there is provided automatic compensation for the changing of height of the body, as the vehicle springs respond to the changing load conditions.

Irrespective of load condition of the truck, by judicious use of one or both of the spring adjusting handles, and of the fixture positioning pin 27, the operator of a crane utilizing this further improvement can more readily keep the weight conveying means positioned within limits wherein the spring will provide requisite automatic control of the proportion of the body weight that is transferred by the said means to the post, thereby with less effort maintaining sufficient pressure on the foot to produce the necessary frictional adhesion to the ground.

It is noteworthy that this type of crane with its inherent portable advantages now to be augmented as result of the decrease in weight made possible by this invention, its easy erection, requiring but one man and no tools, and its transmitting during operation of all vertical crane load to the ground rather than to the truck, and which type of crane heretofore has been handicapped by lack of requisite stability for the bottom of the post, can by application of the improvement herein set forth become an important labor-saving device, in innumerable truck-loading and unloading operations.

While the embodiment herein shown makes use of manually operated block and fall in the material handling appliance, it will be found that this invention will operate equally well with any other suitable manually, or power-operated lifting and lowering mechanism or other type material or article handling means.

While the connecting means shown for the transfer of horizontal thrust from the post to the vehicle is by a loosely sliding shackle, it is obvious that the invention will be found applicable where other suitable connecting means that will accomplish the same results is employed.

In designing a crane of this type it should be observed that the greater the ratio which the length of the anchor arm of the cantilevered post, that part lying below the shackle part 20, 21 bears to the distance measured horizontally from the center of post to the hook at 16, the less will be the tendency of the post shoe to kick outwardly as a result of a given weight attached to the hook.

Whereas in the embodiment shown the invention is applied to a crane, it is obviously applicable to other forms of appliance wherein it is desired to stabilize the foot of a post, and especially where the post acts as a cantilever member wherein the stabilizing of its foot provides fixing for the anchor segment, or anchor arm of the post while the upper cantilevered segment resists bending, such as results from eccentric application of loads thereto.

It is therefore clear that from a broad standpoint the present invention provides for utilization with a vehicle having a spring supported body, a mast disposable in an upright position on the ground adjacent the vehicle and with means at the base of the mast to bear against the ground. Additionally, there are provided connecting means extending between the mast and the body of the vehicle and which means are pivotally mounted with respect to the body and slidably mounted with respect to the mast. Additionally the invention provides a collar or other equivalent means mounted on the mast and resiliently operative force applying means for exerting a lift force on the body that extends between the collar and broadly the body of the vehicle. Specifically this resiliently operative means extends between the collar and the connection. In other words the connection between the mast and the body frees the mast from lifting influence of all pressure exerted by the springs of the vehicle and further permits the up and down flexing of the body on its springs or a fore and aft tilting thereof and a sidewise tilting thereof relative to the mast without disturbing the upright position of the mast with the resilient means acting on the collar to transfer body weight of the vehicle to the mast and thence to the ground beneath the same. This arrangement stabilizes the mast in its vertically upright position even though the body moves relative to the mast during load handling operations such as depositing or lifting a load relative to the body or any other operation in which the body is subjected to varying load conditions.

The invention further provides manually operative means for varying the resilient action of the resilient means. Specifically the invention comprehends an arrangement in which vehicle body weight is resiliently transferred to the mast through the collar.

Having thus described the invention, I claim:

1. In a material handling device of the type described, a post disposable in upright position on the ground adjacent a vehicle having a spring supported material handling body, connecting means longitudinally movably engageable with the post and removably pivotally attachable to the said body about a horizontal axis for conveying lateral thrust to the body while permitting rise and fall of the body relative to the post and also permitting tilting of the body relative to the 10. In a material handling device, a post disposable in upright position, said post including a ground engaging means adapted to rest on the ground adjacent a vehicle having a spring supported material handling body, connecting means longitudinally movably engageable with the post and including horizontal pivot means connectable with the body, said connecting means permitting rise and fall of the body and tilting movement of the body relative to the post without disturbing the upright position of the post, material handling means attached to the post, force applying means positioned above the said ground engaging means and operatively connectable to the spring supported body for lifting a part of the weight of the body onto the ground engaging means, the said applying means including resilient means co-acting with the post to compensate for loss of body weight on the post upon rising movement of the vehicle body under varying load conditions of the body.

11. In the material handling art and for use with a vehicle having a spring supported body, the combination of a post member, means embodied at one end of said member and adapted to bear against the ground when the post is in an upright position adjacent the body of the vehicle, material handling means carried by the post, connecting means axially movably and loosely engaging the post including means connectable with the body for supporting the post in an upright position adjacent the body while permitting rise and fall of and tilting movement of the body relative to the post without disturbing the upright position of the post, a bracket means attached to the post and resiliently operative force applying means extending between said bracket means and the body for resiliently transferring weight of the body to the post to stabilize the post in an upright position upon the ground.

12. A material handling device as defined in and by claim 11, in which said bracket means constitutes an abutment and said resiliently operative means includes a coil spring bearing against said abutment, and rigid means engageable with the body including another abutment bearing against said spring whereby body weight is transferred through said rigid means and said spring to said first mentioned abutment and thence to the post.

13. In a material handling device, the combination including a post adapted for upright positioning adjacent the spring supported body of a vehicle, material handling means carried at one end of the post and ground engaging means embodied with the other end of the post, a connecting means loosely slidably engaging the post and including means detachably connectable with the body for supporting the post in an upright position while permitting rise and fall of the body relative to the post and tilting movement of the body relative to the post, spaced interconnected collar means surrounding the post beneath the connecting means and including laterally offset apertured journal means with the apertures extending longitudinally of the post, an elongated vertical key protruding from the post, said connecting means and said spaced collar means having keyways cooperating with said key, a first rod passing through said journal means and including an upper threaded portion and terminating in an upper end engaging said connecting means, a nut in threaded engagement with the threaded portion of said rod below the uppermost journal means and including a laterally offset portion having a keyway therein cooperating with said key, a second tubular externally threaded rod surrounding said first rod and supported on the lower collar member, a second nut in threaded engagement with said second rod and having a laterally offset portion having a keyway therein cooperating with said key, a coil spring surrounding said first rod and biased between said two laterally offset portions, said second rod including a portion projecting below said lower collar means and surrounding said first rod, said first rod projecting below the terminal end of said second rod and both said rods having an operating handle thereon whereby turning of the respective handles moves the respective laterally offset portions axially to compress or expand said spring and vary the downward force exerted through said connecting means and said first rod and said spring to said lower collar member and thus to the post.

14. A material handling device as defined in and by claim 13, in which said spaced interconnected collar means is axially adjustably mounted on said post.

15. In a material handling device, a post disposable in upright position, said post including a ground engaging means adapted to rest on the ground adjacent a vehicle having a spring supported material handling body, connecting means longitudinally movably engageable with the post and including means connectable with the body, said connecting means permitting rise and fall of the body and tilting movement of the body relative to the post without disturbing the upright position of the post, material handling means attached to the post, force applying means including a connection with the post positioned above the ground engaging means, and means operatively connectable to the spring supported body for lifting a part of the weight of the body on to the ground engaging means, said applying means including resilient means coacting with the post to compensate for loss of body weight on the post upon rising movement of the vehicle body under varying load conditions of the body.

WILLIAM G. ADAMS.

References Cited in the file of this patent

UNITED STATES PATENTS

| Number | Name | Date |
| --- | --- | --- |
| 1,026,901 | Brown | May 21, 1912 |
| 1,359,378 | Holmes | Nov. 16, 1920 |
| 1,459,779 | Lichtenberg | June 26, 1923 |
| 1,736,419 | Smith | Nov. 19, 1929 |
| 2,258,383 | Haniquet | Oct. 7, 1941 |
| 2,410,777 | English et al. | Nov. 5, 1946 |
| 2,501,112 | Webster | Mar. 21, 1950 |

FOREIGN PATENTS

| Number | Country | Date |
| --- | --- | --- |
| 276,729 | Italy | Aug. 13, 1930 |